United States Patent

[11] 3,582,924

| [72] | Inventors | Saburo Uemura<br>Kanagawa-ken;<br>Kiyoshi Himuro, Tokyo, both of, Japan |
|---|---|---|
| [21] | Appl. No. | 824,229 |
| [22] | Filed | May 13, 1969 |
| [45] | Patented | June 1, 1971 |
| [73] | Assignee | Sony Corporation<br>Tokyo, Japan |
| [32] | Priority | May 17, 1968 |
| [33] | | Japan |
| [31] | | 43/33193 |

[54] DISPLACEMENT MEASURING INSTRUMENT
17 Claims, 9 Drawing Figs.

[52] U.S. Cl..................................................... 340/206,
340/197, 340/207, 340/174.1, 179/100.2, 33/125,
324/172
[51] Int. Cl....................................................G08c 19/16,
G01b 7/02, G01p 3/50
[50] Field of Search........................................... 340/174.1
B, 197, 206, 207; 179/100.2 CH; 324/70 C-G, 172,
173, 174, 34, 70 B; 33/125 C

[56] References Cited
UNITED STATES PATENTS
2,947,929   8/1960   Bower........................   179/100.2

Primary Examiner—J. Russell Goudeau
Attorneys—Albert C. Johnston, Robert E. Isner, Lewis H. Eslinger and Alvin Sinderbrand ABSTRACT: A displacement measuring instrument comprising displacement transducer means for generating a phase-modulated signal corresponding to displacement, means for supplying a carrier signal to the transducer means, means for producing a pulse width modulation signal of a width corresponding to a phase difference between the phase-modulated signal and the carrier signal, means for generating a signal of a frequency $n$ times that of the carrier signal, $n$ being an integer, and means for producing an interpolation signal corresponding to a phase difference between the signal of the frequency $n$ times that of the carrier signal and the pulse width modulation signal.

INVENTOR.
SABURO UEMURA
KIYOSHI HIMURO

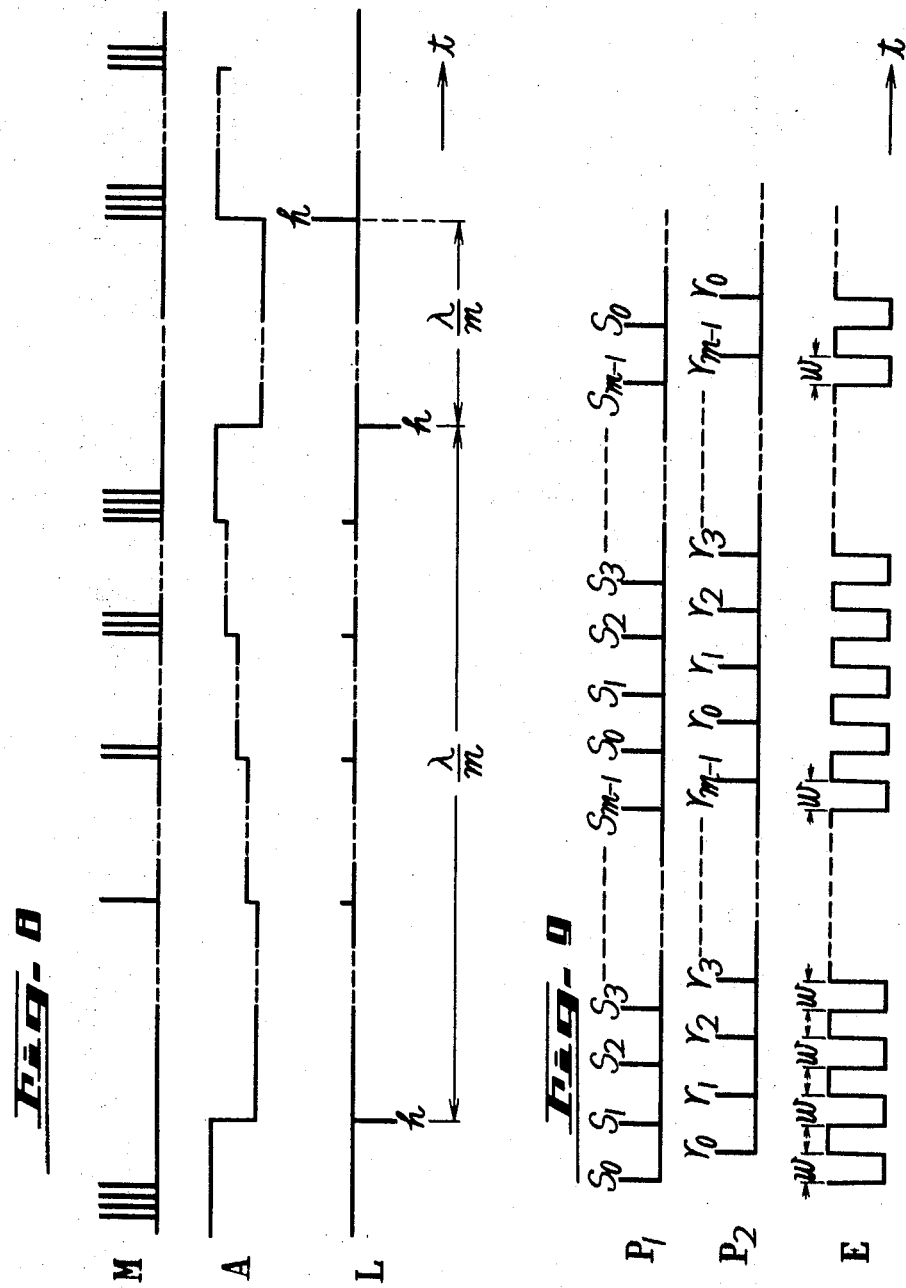

3,582,924

DISPLACEMENT MEASURING INSTRUMENT

CROSS REFERENCES TO RELATED APPLICATIONS

The application filed Jan. 17, 1969, Ser. No. 792,053, entitled "Displacement Measuring Instrument," filed by the same inventors of this application, discloses a displacement measuring instrument of which reference position for measurement may be shifted as desired. U.S. Pat. No. 3,308,449 which issued on Mar. 7, 1967 to Saburo Uemura, entitled "Multi-Gap Magnetic Head" and assigned to the assignee of the present invention discloses a multigap magnetic head particularly adapted for reading a magnetic scale to measure length.

BACKGROUND OF THE INVENTION

1. Field of the Invention

This invention relates to a displacement measuring instrument and in particular to a measuring instrument having an interpolating means.

2. Description of the Prior Art

There has been proposed an instrument for electrical measurement of length, angle or the like in the form of an electric signal to be indicated on a suitable indicator device by the employment of transducers such as, for example, magnetic heads and a magnetic scale which has reference divisions, commonly referred to as magnetic gratings, formed by recording rectangular or sinusoidal signals of a certain wavelength on a magnetic medium. Another instrument has been proposed in which an output signal of a phase proportional to an angular position of a rotor is produced to indicate displacement as in a resolver or sine-cosine generator. In the former, however, it is difficult to use signals of a wavelength below 100 microns as signals of the gratings of the magnetic scale, and this imposes a limitation on the precision of the displacement measurement. In addition, it is difficult in the both prior art instruments to achieve interpolation in a digital form.

SUMMARY OF THE INVENTION

In view of the foregoing, the primary object of the present invention is to provide a displacement measuring instrument of the type that the recorded wavelength on a magnetic scale is electrically divided equally to provide a magnetic scale of a wavelength apparently shorter than that practically recorded on the scale thereby to provide for enhanced precision of displacement measurement.

Another object of the present invention is to provide a displacement measuring instrument which is capable of indicating in a digital form measured values of less than the wavelength of the magnetic scale.

Other objects, features and advantages of this invention will become apparent from the following description taken in conjunction with the accompanying drawings.

BRIEF DESCRIPTION OF THE DRAWINGS

FIG. 8 shows input and output waveforms of a digital-to-analog converter and a differentiation circuit used in FIG. 3; and FIG. 9 shows input and output waveforms of a comparator circuit employed in another example of the displacement measuring instrument of this invention.

DESCRIPTION OF THE PREFERRED EMBODIMENTS

Figure 1:
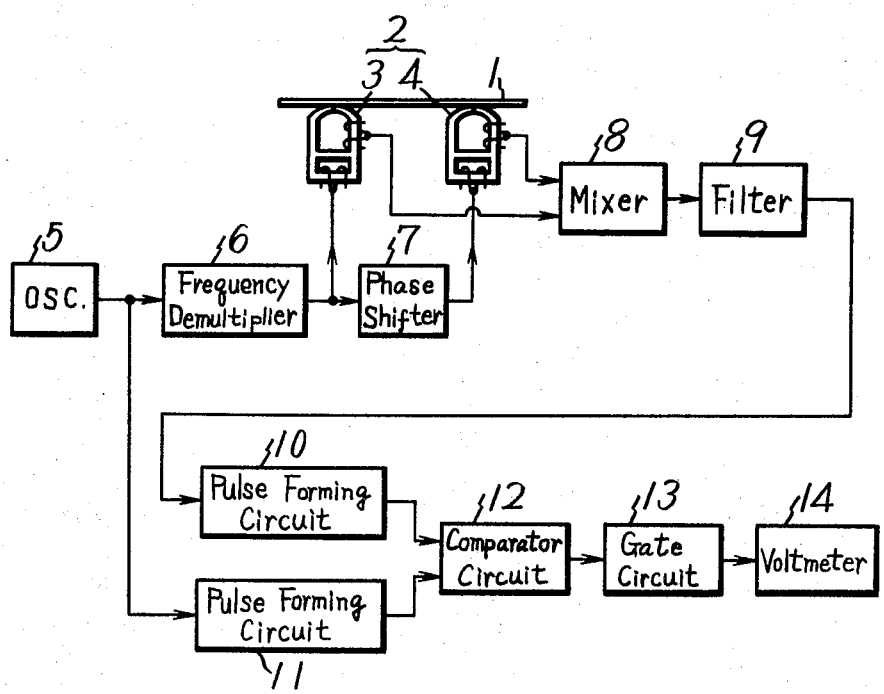
FIG. 1 is a block diagram showing the principles of a displacement measuring instrument using magnetic gratings.

In FIG. 1 there is illustrated a conventional displacement measuring instrument employing a magnetic scale and a pair of magnetic heads. Reference numeral 1 indicates a magnetic scale which is a magnetic medium having magnetic powder coated on, for example, a glass plate, metal strip or the like and on which, for example, a sine wave of a certain wavelength $\lambda$ is recorded. Reference numeral 2 designates a transducer which consists of a pair of, for example, modulation-type magnetic heads 3 and 4 which are held in engagement with the magnetic scale 1 while being spaced apart from each other at a distance of $(n+\frac{1}{4})\lambda$, $n$ being a positive integer including zero. Reference numeral 5 indicates an oscillator of an oscillating frequency $fo$. The output signal of the oscillator 5 is fed to a frequency demultiplier 6 to be frequency demultiplied down to $fo/2$ and the resulting signal is applied as a carrier signal to the magnetic head 3 while being, at the same time, fed to the magnetic head 4 after phase shifted by a phase shifter 7, for example, $\pi/4$ apart from that to the head 3.

Where the magnetic heads 3 and 4 are disposed at a distance $x$ from magnetic gratings $m_1, m_2, m_3...m_n$ of the magnetic scale 1, electromotive forces induced in the magnetic heads 3 and 4 by the magnetic scale 1 are respectively $k_1 \sin 2\pi x/\lambda$ and $k_2 \cos 2\pi x/\lambda$, $k_1$ and $k_2$ being proportional constants. The carriers fed to the magnetic heads 3 and 4 are modulated by the electromotive forces to derive modulated outputs from the magnetic heads 3 and 4. If the output voltage of the magnetic head 3 is taken as $e_1$, it is given by the following equation:

$$e_1 = k_1 \sin \frac{2\pi x}{\lambda} \cdot \cos 2\pi \, fot \tag{1}$$

and if the output voltage of the magnetic head 4 is taken as $e_2$, it is given by the following equation:

$$e_2 = k_2 \cos \frac{2\pi x}{\lambda} \cdot \sin 2\pi \, fot \tag{2}$$

In this case, the carriers are respectively $\sin \pi fo$ and $\sin (\pi fo\, t+\pi/)$ but since the magnetic heads 3 and 4 are modulation type in the present example, their outputs are $\sin 2\pi fot$ and $\cos 2\pi fot$ as indicated in the above equations. The both output signals $e_1$ and $e_2$ are combined together by a mixer circuit 8 to produce a phase-modulated signal output $e_3$ which is given by the following equation:

$$e_3 = k_3 \sin \left(2\pi \, fot + \frac{2\pi x}{\lambda}\right) \tag{3}$$

where $k_3$ is a proportional constant. The phase-modulated signal $e_3$ is applied to a filter 9 to provide a signal of a frequency $fo$ two times that of the signal fed to the magnetic heads 3 and 4 and the resulting signal is applied to a pulse forming circuit 10, providing a pulse.

While, the output signal of the oscillator 5 is applied to a pulse forming circuit 11 to be converted into a pulse which serves as a reference signal. The output pulse signals of the pulse forming circuits 10 and 11 are fed to a comparator circuit, for example, a flip-flop circuit 12 to be compared with each other, thus providing a rectangular wave whose width varies with the phase difference between the both pulses. The rectangular wave is rendered to be of a certain amplitude and is then applied to a low-pass filter 13 of a cutoff frequency, for example, $fo/2$ to be integrated, producing a voltage $e_4$ in proportion to the phase angle $2\pi x/\lambda$ in the equation (3). The voltage $e_4$ is applied to an indicator, for example, a voltmeter 14, thereby to provide a voltage indication in proportion to the relative distance $x$ between the magnetic heads 3 and 4 and the magnetic gratings.

With the measuring instrument described above, it is difficult that signals of a wavelength of, for example, less than 100 microns are recorded as reference divisions on the magnetic scale 1 and this leads to a limitation on the precision of measurement of mechanical displacement and a difficulty is encountered in digital indication of the displacement.

Figure 3:
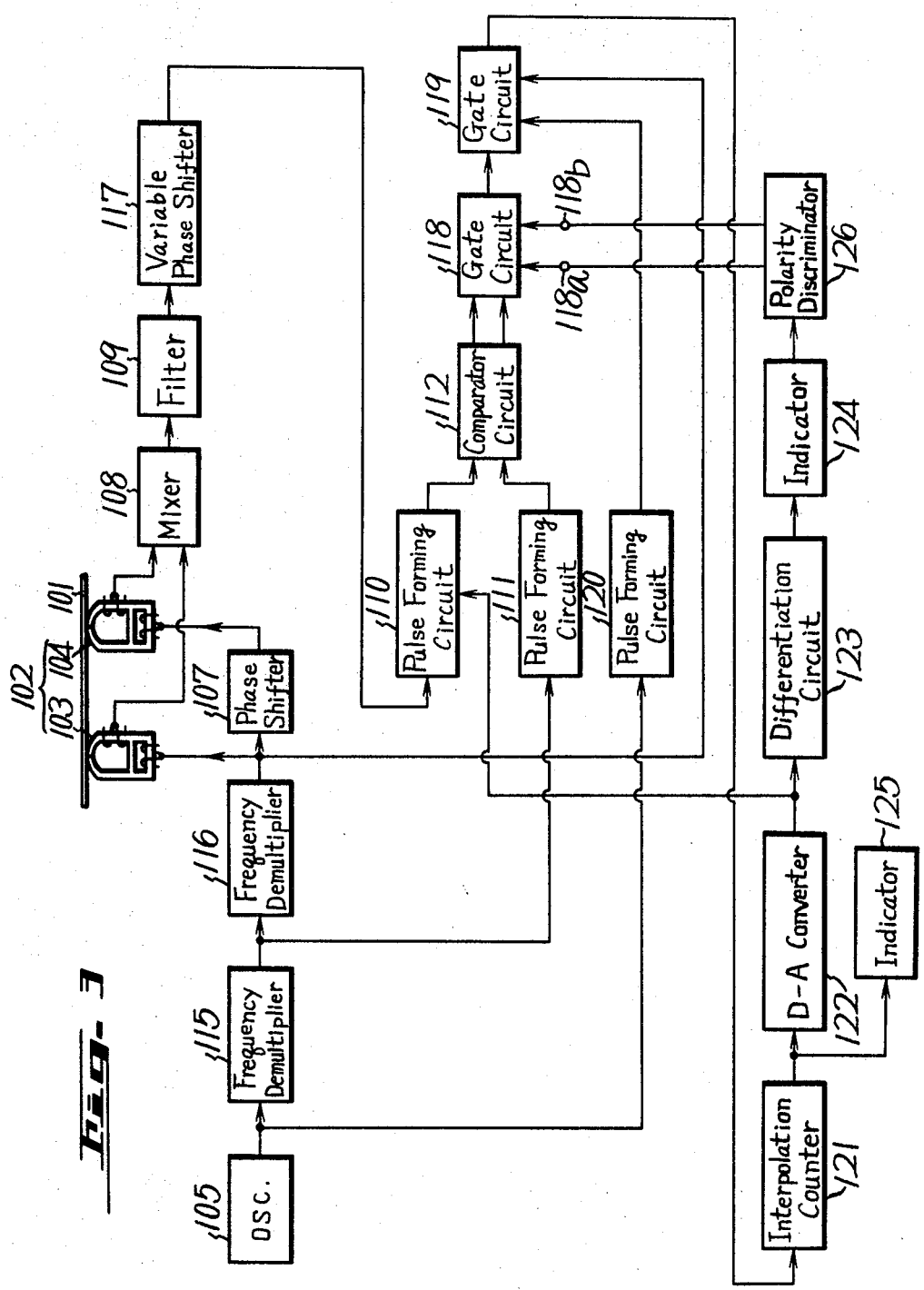
FIG. 3 is a block diagram illustrating the displacement measuring instrument of this invention.

In FIG. 3 there is illustrated one embodiment of the present invention. Reference numeral 105 indicates an oscillator of an oscillation frequency $Fo$ but since the present example requires an oscillation signal of a frequency different from that of the aforementioned oscillator 5, the oscillation output of the oscillator 105 is frequency demultiplied by frequency demultipliers 115 and 116, thereafter being fed to necessary portions. Reference numerals 107, 108 and 109 designate a phase shifter, a mixer circuit and a filter respectively corresponding to those 7, 8 and 9 in FIG. 1.

Reference numeral 117 indicates a variable phase shifter, which is provided in the path through which a composite signal $e_3$ of magnetic heads 103 and 104 engaging a magnetic scale 101 is applied to a comparator circuit 112, in the illustrated example a flip-flop circuit. The variable phase shifter 117 is adapted such that even if the magnetic heads 103 and 104 lie at any positions relative to the magnetic gratings, length or displacement can be measured from the positions of the heads by adjustment of the shifter itself. This system has been proposed in our copending application, Ser. No. 792,053.

In the present example the frequency of the reference signal fed to the flip-flop circuit 112 is a multiple of that of the composite signal applied to the same circuit and in the present example the frequency of the signal which is to be applied to the magnetic heads 103 and 104 is frequency demultiplied. To this end, the output signal of, for example, the oscillator 105 is frequency demultiplied by the frequency demultiplier 115 to produce a signal of a frequency of $mfo12$ ($m=2, 3, 4,...$) and the resulting signal is fed to a pulse forming circuit 111 to produce a pulse. The pulse is applied as a reference signal to the flip-flop circuit 112, while the signal having the frequency of $mfo12$ is further frequency demultiplied $11m$ by the frequency demultiplier 116 to produce a signal of a frequency of $fo12$, which is applied to the both magnetic heads 103 and 104.

Reference numeral 118 indicates a first gate circuit which switchingly selects the outputs of opposite polarities derived from the flip-flop circuit 112. Namely, when the positions of the magnetic heads 103 and 104 relative to the magnetic scale 101 are in a direction of, for example, + (plus) from a reference position, the output of one output terminal of the flip-flop circuit 112 is picked up, and when the magnetic heads 103 and 104 lie in the direction opposite to the aforementioned, that is, in the direction of − (minus) from the reference position, the output from the other output terminal of the flip-flop circuit 112 is picked up, which output is opposite in sense to the output derived from the one output terminal. With such an arrangement, correct measurement is possible irrespective of the positions and transfer direction of the magnetic heads. Reference numerals 118a and 118b designate control terminals for selective pickup of the outputs from the flip-flop circuit 112. The polarity of the output of a first indicator 124 is detected by a polarity discriminator circuit 126, the output of which is fed to the control terminals to selectively pick up the output of the flip-flop circuit 112.

Reference numeral 119 indicates a second gate circuit which is supplied with a clock pulse signal formed by a pulse forming circuit 120 from an oscillation signal of a frequency $Fo$, for example, $Fo=Smfo12$ ($S=2, 3, 4,...$), derived from the oscillator 105. Further, the output of the flip-flop circuit 112 is applied as a gate pulse to the gate circuit 119 through the first gate circuit 118, and the output of the gate circuit 119 is fed to an interpolation counter 121. The interpolation counter 121 is designed to overflow when the counting has reached $m$ or an integral measure of $m$ and to be reset before a next supply of the gate output. In this case, in order that the output of the gate circuit 119 is applied to the interpolation counter 121 in a sampling manner to be counted, a control signal of a frequency $fo$ 12 is applied from the frequency demultiplier 116 to the second gate circuit 119 to ensure resetting of the interpolation counter 121, avoids false operation even in the case of high frequencies.

The output signal of the interpolation counter 121 is applied to a digital-to-analog converter 122, thereafter being fed through a differentiation circuit 123 to the first indicator 124 to provide a digital indication every $\lambda 1m$ of the magnetic scale 101. Further, the output signal of the counter 121 is fed directly to the second indicator 125 to provide a digital indication of an interpolation value of the magnetic scale 101 in a time divisional manner. While, it is possible that the output of the digital-to-analog converter 122 is fed back to the pulse forming circuit 110 so as to remove unstability resulting from noise or the like of the circuit 110.

A description will be given of the operation of the instrument described above.

Figure 4:
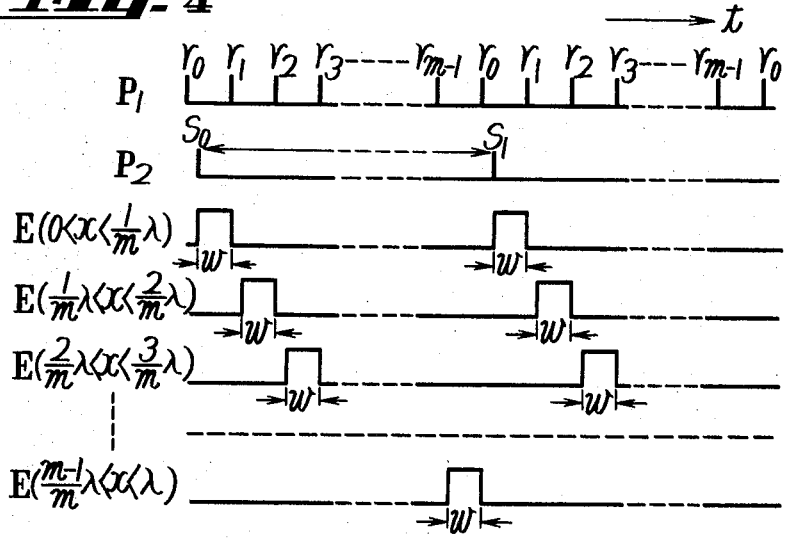
FIG. 4 is a series of waveform diagrams showing input and output of a comparator circuit employed in the instrument depicted in FIG. 3.
Figure 5:
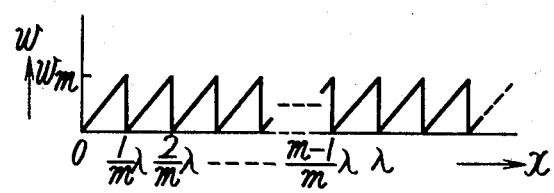
FIG. 5 is a graph showing the relationship between the pulse width of the output signal of the comparator circuit depicted in FIG. 3 and the distance from magnetic heads to magnetic gratings of a magnetic scale.

In the flip-flop circuit 112 the pulse phase-modulated signal of the frequency $fo$ and the reference pulse signal of the frequency $mfo$ are compared with each other. In FIG. 4 reference characters $P_1$ and $P_2$ respectively designate the reference pulse signal and the pulse phase-modulated signal. For example, a set terminal of the flip-flop circuit 112 is supplied with the pulse phase-modulated signal $P_2$, as indicated at $S_0, S_1...$and a reset terminal of the circuit 112 is supplied with the reference pulse signal $P_1$, as indicated at $r_0, r_1, r_2, ...r_{m11}, r_0, r_1, r_2, ...r_{m11}, ...$ From one output terminal of the flip-flop circuit 112 a pulse width modulation signal E of a pulse width W is derived. Where the signal $P_2$ is shifted in response to the distance $x$ from the magnetic gratings $m_1, m_2,...m_n$ of the magnetic scale 101 to the magnetic heads 103 and 104 and $0<x<(1/m)$, the flip-flop circuit 112 is set at $S_0, S_1,...$and is reset every $r_1$. As the distance $x$ approaches from zero to $(1/m\lambda)$, the pulse width W gradually increases from zero to W$m$ and when $(1/m)\lambda a 8 A x << (2/m\lambda)$ the flip-flop circuit 112 is set at $S_0, S_1,...$ and is reset every $r_2$. As the distance $x$ approaches from $(1/m)^-\lambda$ to $(2/m)\lambda$, the pulse width W gradually increases from zero to W$m$ and the same operations are continued at a cycle of $(1/m)\lambda$. In FIG. 5 there is shown a sawtooth wave characteristic resulting from the above operation, the abscissa representing the distances $x$ between the magnetic heads 103 and 104 and the magnetic gratings $m_1, m_2,...m_n$ of the magnetic scale 101 and the ordinate the pulse width W of the pulse width modulation signal E. Thus, the wavelength $\lambda$ of the magnetic scale 101 is electrically divided into $1/m$.

Figure 2:
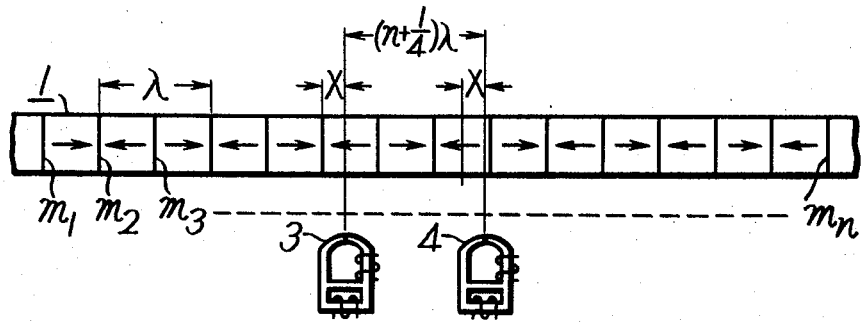
FIG. 2 is a schematic diagram showing one portion of FIG. 1.
Figure 6:
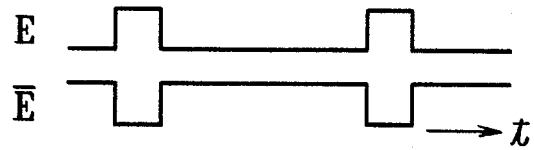
FIG. 6 is a diagram showing waveforms of outputs of the comparator circuit which are opposite in sense.

The first gate circuit 118 is controlled in response to the position of the magnetic heads 103 and 104 relative to the magnetic scale 101, for example, according as the numerical value indicated by the first indicator 124 is positive or negative, thereby to selectively pick up one of the outputs of the flip-flop circuit 112. Assume that the position of the magnetic heads 103 and 104 on the right of the reference points on the magnetic scale 101 is positive and that the position of the heads on the left of the reference points is negative in FIG. 2. The flip-flop circuit 112 is controlled by the gate circuit 118 is such a manner that an output E or $\overline{E}$ shown in FIG. 6 is selectively picked up from one or the other terminal of the circuit 112 according as the magnetic heads 103 and 104 lie in the positive or negative direction, thus providing a complementary number.

Figure 7:
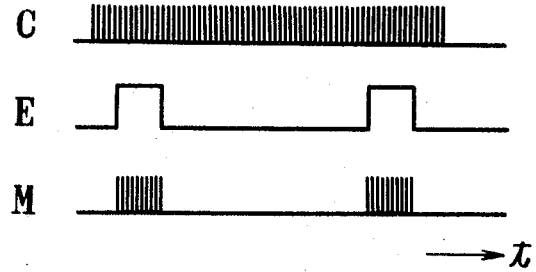
FIG. 7 shows input and output waveforms of a second gate circuit employed in FIG. 3.

The second gate circuit 119 yields a signal M such as shown in FIG. 7 which is produced by gate control of a clock pulse signal C having a frequency $Fo$ ($=Smo12$) with the output signal E derived from the flip-flop circuit 112 through the first gate circuit 118. Namely, interpolation of $1/S$ is achieved in the second gate circuit 119. The output of the second gate circuit 119 is memorized by a counter 121 every cycle and is indicated by the indicator 125 in a digital form.

Since the pulse signal M varies in number with the lapse of time while the magnetic heads varies in position relative to the magnetic scale, the pulse signal M is converted by the digital-to-analog converter 122 into a voltage signal corresponding to the number of the pulses to produce an analog signal A of a stepwise form, as shown in FIG. 8. The signal A is differentiated by the differentiation circuit 123 to provide a pulse signal L such as depicted in FIG. 8. The pulse signal L is applied to the indicator 124 in which only a pulse $h$ of the pulse signal L corresponding to that portion of the signal A varying from a maximum to a minimum is detected and a digital indication is provided at every $(1/m)\lambda$. In this case the pulse $h$ becomes positive or negative depending upon the transfer direction of the magnetic heads relative to the magnetic scale, so that addition or subtraction is achieved in the indicator.

In the foregoing example, the magnetic scale can be regarded as having a wavelength of $(1/m)\lambda$ essentially and the wavelength of $(1/m)\lambda$ is interpolated $1/S$ by the clock pulse. The relative position of the magnetic heads 103 and 104 to the magnetic scale 101 is detected precisely, that is mechanical displacement is measured and is indicated in a digital form by the indicators 124 and 125.

An example of numerical values in the above embodiment is as follows. A magnetic medium having recorded thereon a signal of a wavelength $\lambda$ of $200\mu$ is used as the magnetic scale 101. The oscillation frequency $Fo$ of the oscillator 105 is 200 kHz. and $m=2$ and $S=20$. Accordingly, in the flip-flop circuit 112 the phase-modulated signal having a frequency $fo$ of 10 kHz. and the reference signal having a frequency $2fo$ of 20 kHz. are compared in phase. Further, the wavelength of the signal recorded on the scale is $200/2=100\mu$ and is divided $1/10$, so that mechanical displacement down to $10\mu$ can be measured.

With the present invention described above, the wavelength of the signal recorded as reference divisions on the scale 101 is electrically divided into equal length and a scale of a wavelength essentially shorter than that actually recorded on the scale can be obtained apparently to provide for enhanced precision of measurement.

In the foregoing the frequency of the reference signal is selected to be a multiple of that of the phase-modulated signal but the frequency of the phase-modulated signal may be selected to be a multiple of that of the reference signal. To perform this, it is sufficient only to reverse the relationship between the setting and resetting of the reference signal $P_1$ and the phase-modulated signal $P_2$, so that one wavelength of the magnetic scale can be similarly divided into $1/m$. Also in this case, in the interpolation counter 121 an overflow is achieved, when the counting has reached $m$ or an integral measure of $m$.

Further, the frequencies of the reference signal and the phase-modulated signal may be multiplied to be of the same value. In this case, the set terminal of the flip-flop circuit (the comparator circuit) is supplied with the reference signals $S_0$, $S_1$, $S_2$,...$S_{m11}$, $S_0$, $S_1$, $S_2$,...$S_{m11}$,...and the reset terminal is supplied with the reference signals $r_0$, $r_1$, $r_2$,...$r_{m11}$, $r_0$, $r_1$, $r_2$,...$r_{m11}$,...as shown in FIG. 9. From one output terminal of the flip-flop circuit 112 there is derived a pulse width modulation signal E of the pulse width W. In accordance with the distance $x$ from the magnetic heads 103 and 104 to the magnetic gratings $m_1$, $m_2$,...$m_n$ of the magnetic scale 101, setting and resetting are achieved and the pulse width changes from zero to $Wm$ and varies at every $(1/m\lambda$. One wavelength of the scale, therefor, is equally divided into $1/m$.

In the foregoing example the variable phase shifter 117 is provided in the path through which the composite signal $e_a$ of the magnetic heads 103 and 104 is applied to the flip-flop circuit 112, but the variable phase shifter 117 may be located in the path of the reference signal from the frequency demultiplier 115 to the flip-flop circuit 112.

While the complementary number is obtained by changing over the outputs of opposite polarities from the flip-flop circuit 112 with the first gate circuit 118 in response to the transfer direction of the magnetic heads 103 and 104 relative to the scale 101 is the foregoing, it is also possible to obtain the complementary number by selecting the setting and resetting signals of the flip-flop circuit in opposite relation.

Although the magnetic heads 103 and 104 are magnetic modulation type in the foregoing, modulation-type magnetic heads utilizing the hall effect may be used. In this case, since the frequency of the reproduced signal is the same as those of the carriers supplied, the phase difference between the carriers applied to the magnetic heads 103 and 104 is not $\pi/4$ but $\pi/2$.

While the present invention has been described as applied to the measuring instrument employing the magnetic scale, the invention is applicable to a resolver or sine-cosine generator or a measuring instrument such as disclosed in the U.S. Pat. No. 2,799,835.

It will be apparent that many modifications and variations may be effected without departing from the scope of the novel concepts of this invention.

We claim as our invention:

1. A displacement measuring instrument comprising:
   1. displacement transducer means for generating a phase-modulated signal corresponding to a displacement,
   2. means for supplying a carrier signal to the transducer means,
   3. means for producing from the phase-modulated signal and the carrier signal a pulse width modulation signal of a width corresponding to a phase difference between the phase-modulated signal and the carrier signal,
   4. means for producing a signal of a frequency $n$ times that of the carrier signal, $n$ being an integer, and
   5. means for producing an interpolation signal corresponding to a phase difference between the signal having the frequency $n$ times that of the carrier signal and the pulse width modulation signal.

2. A displacement measuring instrument comprising:
   1. displacement transducer means for generating a phase-modulated signal corresponding to a displacement,
   2. means for supplying a carrier signal to the transducer means,
   3. means for producing from the phase-modulation signal and the carrier signal a pulse width modulation signal of a width corresponding to a phase difference between the phase-modulated signal and the carrier signal,
   4. means for producing a signal of a frequency $n$ times that of the pulse width modulation signal, and
   5. means for producing an interpolation signal corresponding to a phase difference between the signal having the frequency $n$ times that of the carrier signal and the carrier signal.

3. A displacement measuring instrument comprising:
   1. displacement transducer means for generating a phase-modulated signal corresponding to a displacement,
   2. means for supplying a carrier signal to the transducer means,
   3. means for producing from the phase-modulated signal and the carrier signal a pulse width modulation signal of a width corresponding to a phase difference between the phase-modulated signal and the carrier signal,
   4. means for producing a signal of a frequency $n$ times that of the pulse width modulation signal,
   5. means for producing a signal of a frequency $n$ times that of the carrier signal, and
   6. means for producing an interpolation signal corresponding to a phase difference between the signal having the frequency $n$ times of the pulse width modulation signal and the signal having the frequency $n$ times that of the carrier signal.

4. A displacement measuring instrument comprising:
   1. displacement transducer means for generating a phase-modulated signal corresponding to a displacement,
   2. means for supplying a carrier signal to the transducer means,
   3. means for producing from the phase-modulated signal and the carrier signal a pulse width modulation signal of a width corresponding to a phase difference between the phase-modulated signal and the carrier signal, 4. means for producing a signal of a frequency $n$ times that of the carrier signal, $n$ being an integer, and 5. a flip-flop circuit supplied with the signal having the frequency $n$ times that of the carrier signal and the pulse width modulation signal to produce an interpolation signal corresponding to a phase difference between the two signals.

5. A displacement measuring instrument as claimed in claim 4 which includes means for rendering the width of the interpolation signal into a digital form.

6. A displacement measuring instrument as claimed in claim 5 which includes means for indicating a digital signal.

7. A displacement measuring instrument comprising:
1. displacement transducer means for generating a phase-modulated signal corresponding to a displacement,
2. means for supplying a carrier signal to the transducer means,
3. means for producing from the phase-modulated signal and the carrier signal a pulse width modulation signal of a width corresponding to a phase difference between the phase-modulation signal and the carrier signal,
4. means for producing a signal of a frequency $n$ times that of the pulse width modulation signal, and
5. a flip-flop circuit supplied with the signal having the frequency $n$ times that of the carrier signal and the pulse width modulation signal to produce an interpolation signal corresponding to a phase difference between the two signals.

8. A displacement measuring instrument as claimed in claim 7 which includes means for rendering the width of the interpolation signal into a digital form.

9. A displacement measuring instrument as claimed in claim 8 which includes means for indicating a digital signal.

10. A displacement measuring instrument comprising:
1. displacement transducer means for generating a phase-modulated signal corresponding to a displacement,
2. means for supplying a carrier signal to the transducer means,
3. means for producing from the phase-modulation signal and the carrier signal a pulse width modulation signal of a width corresponding to a phase difference between the phase-modulated signal and the carrier signal,
4. means for producing a signal of a frequency $n$ times that of the pulse width modulation signal,
5. means for producing a signal of a frequency $n$ times that of the carrier signal, and
6. a flip-flop circuit supplied with the signal having the frequency $n$ times that of the carrier signal and the pulse width modulation signal to produce an interpolation signal corresponding to a phase difference between the two signals.

11. A displacement measuring instrument as claimed in claim 10 which includes means for rendering the width of the interpolation signal into a digital form.

12. A displacement measuring instrument as claimed in claim 11 which includes means for indicating a digital signal.

13. A displacement measuring instrument comprising:
1. displacement transducer means,
2. signal-generating means,
3. a circuit for demultiplying the frequency of a signal of the signal-generating means down to $1/n$,
4. means for supplying the demultiplied signal to the displacement transducer means,
5. means for deriving from the displacement transducer means a pulse width modulation signal corresponding to a displacement,
6. a flip-flop circuit actuated by the signal of the signal-generating means and the pulse width modulation signal, and
7. means for converting the output of the flip-flop circuit into a digital signal.

14. A displacement measuring instrument as claimed in claim 13 which includes an oscillator, a signal of the oscillator being fed to the signal-generating means to be frequency-demultiplied.

15. A displacement measuring instrument as claimed in claim 14 in which the converting means includes a gate circuit, the gate circuit permitting the passage of the signal of the oscillator therethrough while an output signal is derived from the flip-flop circuit.

16. A displacement measuring instrument as claimed in claim 15 which includes an interpolation counter for counting the output of the gate circuit.

17. A displacement measuring instrument as claimed in claim 13 in which the transducer means includes a pair of magnetic heads and a magnetic scale having magnetic gratings recorded thereon.